United States Patent
Kharatishvili et al.

(10) Patent No.: US 9,852,174 B2
(45) Date of Patent: *Dec. 26, 2017

(54) REDUCING UPDATE CONFLICTS WHEN MAINTAINING VIEWS

(71) Applicant: Microsoft Technology Licensing, LLC, Redmond, WA (US)

(72) Inventors: Tengiz Kharatishvili, Sammamish, WA (US); Wei Xiao, Redmond, WA (US); Stefano Stefani, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/255,327

(22) Filed: Sep. 2, 2016

(65) Prior Publication Data
US 2016/0371325 A1 Dec. 22, 2016

Related U.S. Application Data

(63) Continuation of application No. 11/796,865, filed on Apr. 30, 2007, now Pat. No. 9,483,525.

(51) Int. Cl.
*G06F 17/30* (2006.01)

(52) U.S. Cl.
CPC .. *G06F 17/30377* (2013.01); *G06F 17/30339* (2013.01); *G06F 17/30371* (2013.01); *G06F 17/30457* (2013.01); *G06F 17/30477* (2013.01)

(58) Field of Classification Search
CPC ........... G06F 17/3048; G06F 17/30516; G06F 17/30457; G06F 17/30339; G06F 17/30371; G06F 17/30377; G06F 17/30477
See application file for complete search history.

(56) References Cited

U.S. PATENT DOCUMENTS

| 5,133,075 A | 7/1992 | Risch |
| 5,396,587 A | 3/1995 | Reed et al. |
| 5,471,629 A | 11/1995 | Risch |
| 5,870,758 A | 2/1999 | Bamford et al. |

(Continued)

OTHER PUBLICATIONS

"Understanding Row Versioning-Based Isolation Levels", Retrieved From <<http://msdn2.microsoft.com/en-us/library/ms189050(d=printer).aspx>>, Feb. 1, 2007, 4 Pages.

(Continued)

*Primary Examiner* — Dinku Gebresenbet
(74) *Attorney, Agent, or Firm* — Harness, Dickey & Pierce, P.L.C.

(57) ABSTRACT

Aspects of the subject matter described herein relate to reducing update conflicts when maintaining views. In aspects, a transaction in snapshot isolation may update a materialized view. Instead of being able to view the update within the transaction, the update is hidden to prevent the transaction from obtaining inconsistent data. When a transaction is not supposed to see an update to a materialized view that occurs within the transaction, additional information associated with the materialized view may indicate this. When a query of the materialized view is made within the transaction, the query engine may use the additional information to exclude data from the update in the result.

20 Claims, 7 Drawing Sheets

(56) References Cited

U.S. PATENT DOCUMENTS

| | | | |
|---|---|---|---|
| 5,999,946 | A | 12/1999 | Bailis et al. |
| 6,006,216 | A | 12/1999 | Griffin et al. |
| 6,026,390 | A | 2/2000 | Ross et al. |
| 6,125,360 | A | 9/2000 | Witkowski et al. |
| 6,192,377 | B1 | 2/2001 | Ganesh et al. |
| 6,334,128 | B1 | 12/2001 | Norcott et al. |
| 6,353,828 | B1 | 3/2002 | Ganesh et al. |
| 6,353,835 | B1 | 3/2002 | Lieuwen |
| 6,484,159 | B1 | 11/2002 | Mumick et al. |
| 6,546,402 | B1 | 4/2003 | Beyer et al. |
| 6,581,205 | B1 | 6/2003 | Cochrane et al. |
| 6,671,715 | B1 | 12/2003 | Langseth et al. |
| 7,028,057 | B1 | 4/2006 | Vasudevan et al. |
| 7,092,951 | B1 | 8/2006 | Luo et al. |
| 7,143,340 | B2 | 11/2006 | Brid |
| 7,158,994 | B1 | 1/2007 | Smith et al. |
| 7,162,467 | B2 | 1/2007 | Eshleman et al. |
| 7,181,452 | B1 | 2/2007 | Luo et al. |
| 7,653,665 | B1 | 1/2010 | Stefani et al. |
| 8,200,700 | B2 | 6/2012 | Moore et al. |
| 2004/0064441 | A1 | 4/2004 | Tow |
| 2005/0033720 | A1 | 2/2005 | Verma et al. |
| 2005/0055381 | A1* | 3/2005 | Ganesh ............ G06F 17/30516 707/999.2 |
| 2005/0102326 | A1 | 5/2005 | Peleg et al. |
| 2005/0216462 | A1 | 9/2005 | Xiao |
| 2006/0015490 | A1 | 1/2006 | Denuit et al. |
| 2006/0122964 | A1 | 6/2006 | Yu et al. |
| 2006/0219772 | A1 | 10/2006 | Bernstein et al. |
| 2007/0219935 | A1 | 9/2007 | Surasinghe |

OTHER PUBLICATIONS

"Amended claims Filed in Taiwan Patent Application No. 097111079", Filed Date: Feb. 21, 2014, 6 Pages.

"Final Office Action Issued in U.S Appl. No. 11/796,865", Mailed Date: Sep. 24, 2013, 21 Pages.

"Final Office Action Issued in U.S Appl. No. 11/796,865", Mailed Date: Dec. 10, 2010, 16 Pages.

"Non-Final Office Action Issued in U.S Appl. No. 11/796,865", Mailed Date: Jul. 5, 2012, 16 Pages.

"Non-Final Office Action Issued in U.S Appl. No. 11/796,865", Mailed Date: Jun. 24, 2010, 17 Pages.

"Non-Final Office Action Issued in U.S Appl. No. 11/796,865", Mailed Date: Apr. 14, 2015, 27 Pages.

"Non-Final Office Action Issued in U.S Appl. No. 11/796,865", Mailed Date: Jan. 20, 2016, 18 Pages.

"Notice of Allowance Issued in U.S Appl. No. 11/796,865", Mailed Date: Jul. 19, 2016, 7 Pages.

"Notice of Allowance Issued in Taiwan Patent Application No. 97111079", Mailed Date: Jul. 30, 2014, 4 Pages.

"Office Action and Search Report Issued in Taiwan Patent Application No. 97111079", Mailed Date: Nov. 26, 2013, 9 Pages.

Bello, et al. "Materialized Views in Oracle", In Proceedings of the 24th Very Large Data Bases (VLDB) Conferences, Aug. 24, 1998, pp. 659-664.

Hanson, et al., "Improving Performance with SQL Server 2005 Indexed Views", Retrieved From http://www.microsoft.com/technet/prodtechnol/sql/2005/imppffiv.mspx>>, May 1, 2005, 19 Pages.

"International Search Report & Written Opinion Issued in PCT Application No. PCT/US2008/058223", Mailed Date: Aug. 28, 2008, 12 Pages.

Ross, et al,. "Materialized View Maintenance and Integrity Constraint Checking: Trading Space for Time", in Proceedings of the 1996 ACM SIGMOD International Conference on Management of Data, Jun. 1, 1996, pp. 447-458.

"Response to Non-Final Office Action Filed in U.S Appl. No. 11/796,865", Filed Date: Apr. 6, 2016, 13 Pages.

"Response to Non-Final Office Action Filed in U.S Appl. No. 11/796,865", Filed Date: Jul. 14, 2015, 14 Pages.

"Response to Final Office Action Filed in U.S Appl. No. 11/796,865", Filed Date: Dec. 23, 2013, 11 Pages.

"Response to Non-Final Office Action Filed in U.S Appl. No. 11/796,865", Filed Date: Oct. 1, 2012, 12 Pages.

"Response to Final Office Action Filed in U.S Appl. No. 11/796,865", Filed Date: Mar. 10, 2011, 12 Pages.

"Response to Non-Final Office Action Filed in U.S Appl. No. 11/796,865", Filed Date: Sep. 21, 2010, 12 Pages.

* cited by examiner

FIG. 2

| Customer | Balance |
|---|---|
| Stefano | 100 |
| Bob | 500 |

205

| Step | User 1 | User 2 |
|---|---|---|
| 210 | Stefano begins a transaction X1 | |
| 211 | | Stefano's wife begins transaction X2 |
| 212 | Obtain balance ($100) | |
| 213 | Deposit $50 | |
| 214 | Update balance in bank account ($150) | |
| 215 | Commit transaction | |
| 216 | | Obtain balance ($100) |
| 217 | | Deposit $20 |
| 218 | | Update balance in bank account ($120) |
| 219 | | Commit transaction |

206

| Step | Transaction X1 | Transactions X2 |
|---|---|---|
| 390 | Begins | |
| 391 | | Begins |
| 392 | Insert a row (1, X) into table 310 | |
| 393 | | Insert a row (1, Y) into table 316 |

FIG. 4

| Step | User 1 | User 2 |
|---|---|---|
| 401 | Begin Transaction X1 | |
| 402 | | Begin Transaction X2 |
| 403 | Insert row R1 into T1 | |
| 404 | Commit Transaction | |
| 405 | | Insert row R2 into T2 |
| 406 | | Select from V |
| 407 | | Select from T1 join T2 |
| 408 | | Commit Transaction |

FIG. 5

Current State of Table — 505

| User Visible Fields 506 | Additional Data 507 |
|---|---|
| User Data for Row1 | Additional Data Regarding Row1 |
| User Data for Row2 | Additional Data Regarding Row 2 |
| ... | ... |
| User Data for RowN | Additional Data Regarding RowN |

Prior Versions of Table — 510

| User Visible Fields 511 | Additional Data 512 |
|---|---|
| User Data for Row1 | Additional Data Regarding Row1 |
| User Data for Row2 | Additional Data Regarding Row 2 |
| ... | ... |
| User Data for RowN | Additional Data Regarding RowN |

Time of Commit — 515

| Transaction ID | Commit Time |
|---|---|
| 1 | T1 |
| 2 | T2 |
| ... | ... |
| N | TN |

REDUCING UPDATE CONFLICTS WHEN MAINTAINING VIEWS

CROSS-REFERENCE TO RELATED APPLICATIONS

This application claims priority to and is a continuation of co-pending U.S. patent application Ser. No. 11/796,865 entitled "Reducing update conflicts when maintaining views" and filed Apr. 30, 2007, which is incorporated herein by reference.

BACKGROUND

A database may implement serializable isolation to avoid or eliminate update conflicts during transactions. When a database implements serializable isolation, the database provides an illusion to a transaction that makes it appear to the transaction that the transaction is the only transaction currently involved with the database. In serializable isolation, the transaction does not have to worry about other transactions concurrently changing data values. To provide a serializable isolation, the database may delay transactions while a particular transaction is allowed to proceed. This may lead to unacceptable performance or concurrency issues.

SUMMARY

Briefly, aspects of the subject matter described herein relate to reducing update conflicts when maintaining views. In aspects, a transaction in snapshot isolation may update a materialized view. Instead of being able to view the update within the transaction, the update is hidden to prevent the transaction from obtaining inconsistent data. When a transaction is not supposed to see an update to a materialized view that occurs within the transaction, additional information associated with the materialized view may indicate this. When a query of the materialized view is made within the transaction, the query engine may use the additional information to exclude data from the update in the result.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

BRIEF DESCRIPTION OF THE DRAWINGS

FIG. 2 is a block diagram that generally represents one example in which a database implementing snapshot isolation may create an inconsistency in accordance with aspects of the subject matter described herein;

FIG. 4 is another example of a sequence of transaction activities that may lead to this problem in accordance with aspects of the subject matter described herein;

FIG. 5 shows three exemplary data structures that may be used in a database in accordance with aspects of the subject matter described herein.

DETAILED DESCRIPTION

Exemplary Operating Environment

Figure 1:
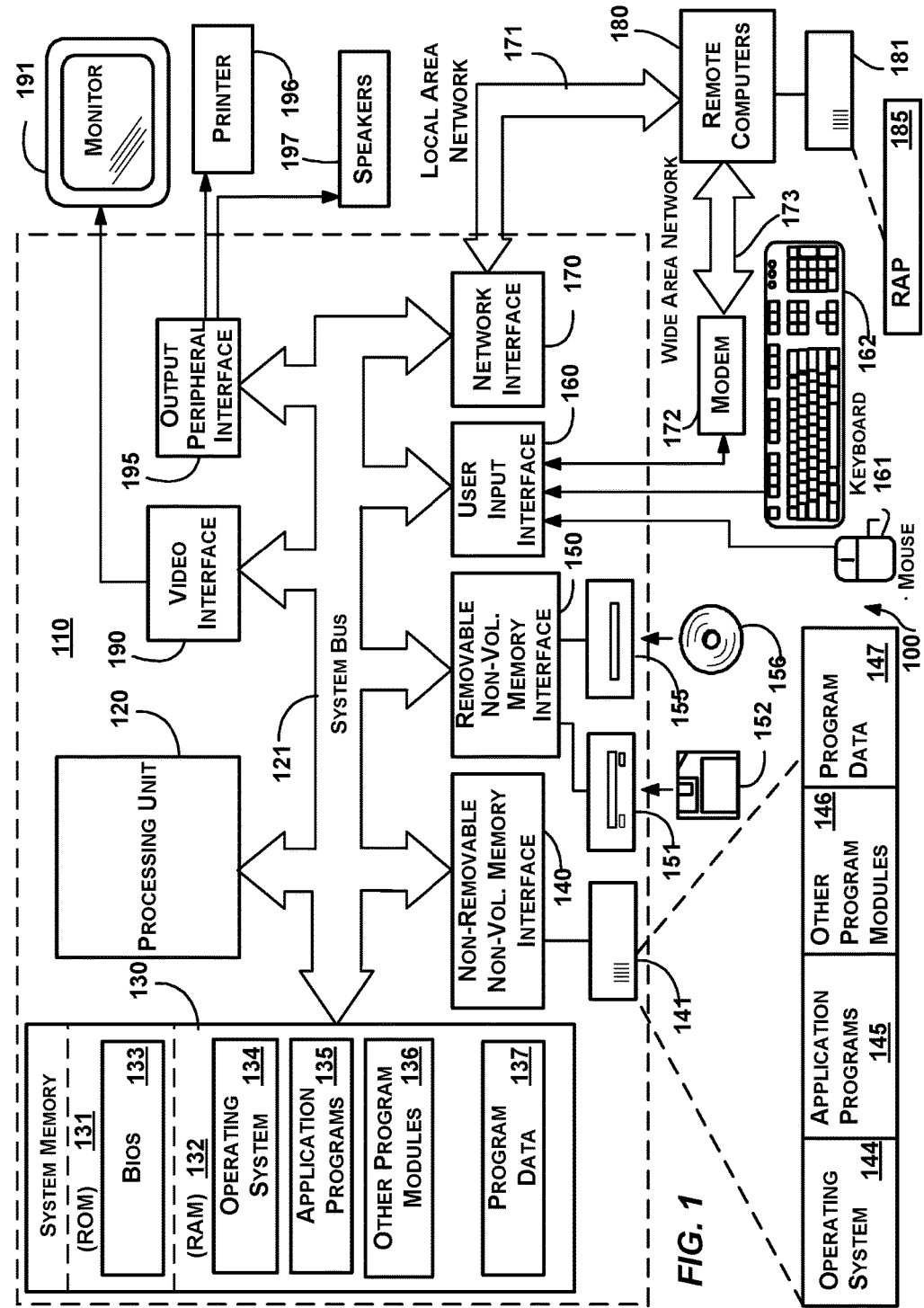
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Reducing Conflicts

A database may also implement snapshot isolation in an attempt to reduce update conflicts during transactions. In snapshot isolation, a database provides a transaction with a view of the data in the database as of a certain point in time (sometimes referred to as the "snapshot time"). If anything is changed after the snapshot time by an updater other than the transaction, the database hides the changes and shows the data as it existed at the snapshot time.

Snapshot isolation may allow more throughput for applications utilizing the database as it may involve much fewer delays. In addition, as compared to other mechanisms, snapshot isolation environments may be much easier to design applications and database schemas as compared to environments that involve blocking and locking when reading or updating database values updated by concurrent transactions and when updating database values than have been read by other transaction. Snapshot isolation, however, may lead to anomalies in data consistency depending on access patterns.

In one approach, when access patterns in a snapshot isolation environment may lead to inconsistent data, the DBMS abort a transaction that is trying to update data. When snapshot isolation is used, a situation in which inconsistent data may occur if a transaction is allowed to proceed without special precautions is sometimes referred to as an update conflict.

With the approach mentioned above, as the frequency of update conflicts increases, the throughput of the database may begin to suffer. At a sufficient frequency of update conflicts, the throughput of a database utilizing snapshot isolation and aborting transactions that may lead to inconsistent data may approach or become worse than that of a database using serializable isolation.

One situation in which using snapshot isolation may lead to inconsistent data is in the use of materialized views. A materialized view is a precomputed result of a query involved with one or more tables. In a materialized view, the results of the query may be stored in a table or other database object for quick reference thereafter. As the one or more tables of the query corresponding to the materialized view change, the materialized view may be incrementally updated as appropriate to reflect the changes. For example, in a materialized view that includes the sums of values in other tables, when new rows are added, deleted, or changed in the other tables, the sums in the materialized view may be updated to reflect the addition, deletion, or changing of the values in the other tables. As will be recognized, a materialized view may dramatically improve performance for subsequent queries that use the materialized view.

FIG. 2 is a block diagram that generally represents one example in which a database implementing snapshot isolation may create an inconsistency in accordance with aspects of the subject matter described herein. Table 205 includes two rows. Each row includes a customer identifier and a balance for the customer.

Table 206 includes a sequence of steps that may occur with respect to Stefano's balance. At step 210, Stefano begins a transaction X1 by inserting his bank card into an ATM machine. At step 210, Stefano's wife begins a transaction X2 by inserting her bank card into an ATM machine.

At step 212, Stefano obtains his balance which is $100. At step 213, Stefano deposits $50 dollars. The ATM calculates the new balance based on the deposit. At step 214, the ATM updates the balance in the bank account to $150 for Stefano. At step 215, the ATM commits the transaction.

At step 216, the ATM that Stefano's wife is using obtains the balance. In snapshot isolation, the balance retrieved by the ATM would be $100. At step 217, Stefano's wife deposits $20 dollars into the ATM. The ATM calculates the new balance (i.e., $120) based on the deposit. At step 218, the ATM updates the balance in the bank account to $120 for Stefano. At block 219, the ATM commits the transaction.

As can be seen by this example, in snapshot isolation without any corrective or preventative steps, this sequence of data accesses leads to an erroneous balance for Stefano. In one embodiment, inconsistent data may be avoided in this scenario by having a transaction read the value of what it is changing before it finally commits the transaction. If the value has changed since the snapshot isolation began, the database may abort the transaction. The application is then free to start another transaction and attempt to update the value.

Figures 3A, 3B:
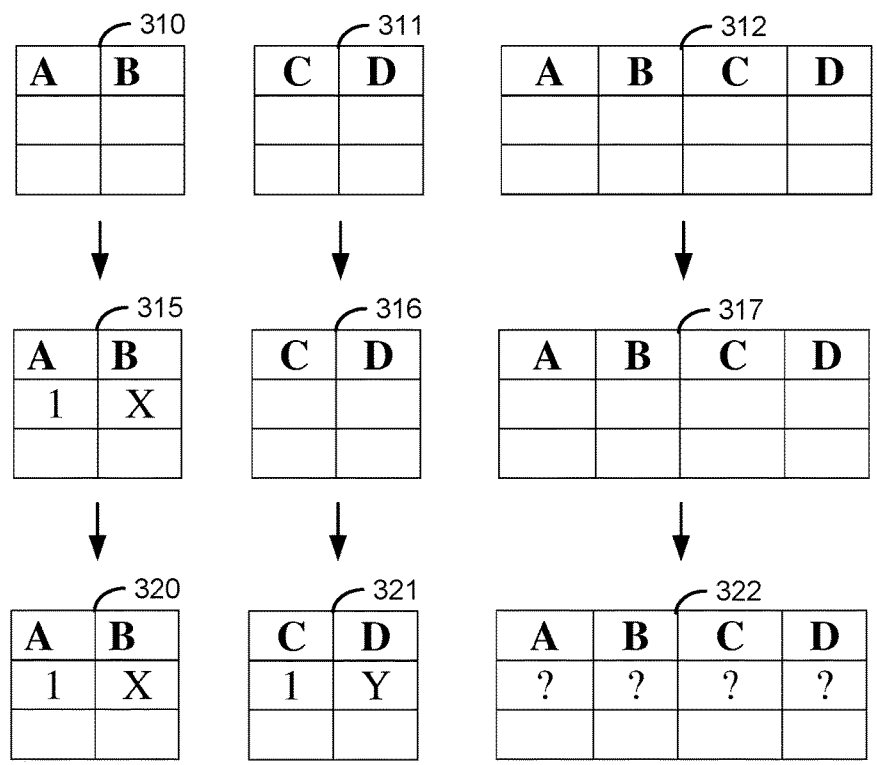
FIGS. 3A-3B illustrate tables that generally represents another example in which a database implementing snapshot isolation may create an inconsistency in accordance with aspects of the subject matter described herein.

FIGS. 3A-3B illustrate tables that generally represents another example in which a database implementing snapshot isolation may create an inconsistency in accordance with aspects of the subject matter described herein. Turning to FIG. 3A, there is shown three tables 305-307. Table 307 is a materialized view that is created by joining tables 305 and 310 where the value in the A field is equal to the value in the C field. With the values shown in the tables 305 and 306, the values shown in the materialized view 307 would result.

Turning to FIG. 3B, tables 310-312, 315-317, and 320-322 correspond to tables 305-307, respectively, at different stages of two concurrently running transactions. Consider two concurrent transactions X1 and X2 as shown in table 325. Before step 390, none of the tables includes any data. This is shown in tables 310-312. At step 390, transaction X1 begins. At step 391, transaction X2 begins.

At step 392, transaction X1 inserts a row (1, X) into table 310 producing table 315. Because the transactions are executing in snapshot isolation, transaction X2 does not see the change made to table 310.

At step 393, transaction X2 inserts a row (1, Y) into table 316 producing table 321. Because the transactions are executing in snapshot isolation, transaction X1 does not see the change made to table 316.

At step 393, the question becomes what should be in the materialized view 322. According to the criteria used in building and maintaining the materialized view, if both X1 and X2 commit, the materialized view 322 should be updated to include a row including (1, X, 1, Y) for (A, B, C, D) fields of the materialized view 322. If transaction X2 inserts this row into the materialized view and then commits and then transaction X1 aborts, the abort of transaction X1 may not roll back the changes made in the materialized view 322 as these were made by transaction X2. In one embodiment, a transaction may only roll back the changes the transaction itself made. On the other hand, if transaction X2 does not insert a row into the materialized view 322, problems may also occur. If transaction X2 commits and then X1 commits and X1 does not see the changes made by X2 (because of transaction isolation), X1 may not update the materialized view 322. In this scenario, after X1 commits the materialized view 322 may not be updated correctly.

In one embodiment, this problem may be addressed by delaying updating the materialized view 322 by transaction X2 until all transactions that started before X2 and that affect a row needing updating in the materialized view 322 commit or abort. The actions that may be performed by transaction X2 may occur as follows:

1. Insert record into the table 316.
2. Attempt to combine the newly inserted row in table 316 with the rows in the other table(s) involved in the view definition (e.g., table 315), to determine whether the change needs to be reflected in the materialized view and how it should be reflected. At this step, snapshot isolation is ignored for determining the set of changes to be applied against the materialized view. In other words, transaction X2 may be allowed to see the values that transactions X1 has changed within the X1 transaction after the beginning of the X2 transaction, as long as they have been committed, and consequently the corresponding locks released. If the change(s) made by another transaction(s) is such that the materialized view 322 may need updating if the other transaction(s) commits, transaction X2 blocks until the other transaction(s) commits or aborts.

3. Make changes in materialized view 322 as appropriate.

Another data inconsistency may occur if the transaction X2 reads the materialized view 322 after the view 322 has been updated in response to a change in the table 320 made by another concurrent transaction (e.g., X1) that committed its changes after X2 started and consequently its snapshot was taken. Even if the concurrent transaction X1 completed in the meanwhile, the changes it made should not be visible to X2, because transaction X1's changes were committed after X2's snapshot was taken.

To understand this problem, it may be helpful to realize that under normal circumstances, a transaction can see changes that the transaction itself has caused to happen even before these changes have been committed. Thus, if a transaction updates a materialized view using a change that occurred after the snapshot time of the transaction and then the transaction reads the table, the transaction may see a data value that the transaction is not supposed to see during snapshot isolation.

When reading data from a materialized view, the results should be identical to reading the underlying tables. Materialized view access should only accelerate the response time, without affecting the semantics and result of the operation. In the example above, if transaction X2 joined table 320 with table 321, it would receive an empty result set, because the row inserted by transaction X1 is not visible in X2's snapshot. The same result should be produced when accessing the view.

FIG. 4 is another example of a sequence of transaction activities that may lead to this problem in accordance with aspects of the subject matter described herein. T1 and T2 are two tables and V is a materialized view that is created as a join of T1 and T2. Furthermore, T1 and T2 may be assumed to already contain some data before the transactions T1 and T2 begin.

In step 403 user 1 inserts a row R1 into T1 and commits the transaction. As a result the following row appears in T1:

| T1 primary key columns | T1 data columns | timestamp of X1 |
| --- | --- | --- |

User 2 has already started s snapshot isolation transaction; hence the data committed after step 402 should not be visible to user 2. However, when on step 405 user 2 inserts a row R2 into T2, the index for V needs to be correctly maintained. Therefore, the materialized view V row that corresponds to the combination of R1 and R2 is added.

As a result of step 405, the following row appears in T2:

| T2 primary key columns | T2 data columns | timestamp of X2 |
| --- | --- | --- |

And the following row appears in the materialized view:

| V primary key columns | V data columns | timestamp of X2 |
| --- | --- | --- |

Since the incremental index maintenance actions are done in the same transaction, the row in V is tagged with the timestamp of X2. Steps 406 and 407, however, will return inconsistent data despite being functionally equivalent. Select from V will return the index row that corresponds to the combination of R1 and R2 since this row was created by the current transaction X2, but Select from T1 join T2 will not.

In one approach, this problem may be addressed by aborting the transaction X2 before X2 updates a materialized view with a change that should not be seen by the transaction X2. This approach, however, may affect database throughput if data access patterns are such that it is frequently employed.

In one embodiment, this problem may be addressed without aborting the transaction. This may be done by hiding the changes in a materialized view from a transaction in snapshot isolation that should not see the changes.

FIG. 5 shows three exemplary data structures that may be used in a database in accordance with aspects of the subject matter described herein. The table 505 shows the current state of a table. The tables 505 and 510 include user visible fields 506 and 511 and additional data 507 and 512. In another embodiment, the additional data 507 and 512 may be associated with the appropriate rows instead of included in the tables 505 and 510. The visible fields 506 and 511 may include one or more columns that an application may or could have accessed (e.g., in the case of the prior version table 510). The additional data 507 and 512 may include other data that the database stores with or associated with each row. For example, for each row, the additional data may include an ID of the transaction that last updated the row as well as a value that references the row as it existed prior to the update by the transaction.

Before a transaction updates a row, the row may be moved to the prior versions table 510. The additional data in the updated row may include a value that identifies the prior version in the prior versions table 510 as well as a transaction ID of the transaction that updated the row.

In snapshot isolation, when a transaction seeks to access a row in the table 505, the DBMS may first check to see if the additional data for the row includes the ID associated with the transaction. If the row includes the ID associated with the transaction, the DBMS may provide the row state as indicated in the table 505 to the transaction. If not, the DBMS may determine the commit time of the row by accessing the commit data structure 515. If the commit time of the row is after the snapshot time of the transaction, the DBMS may access the most prior version of the row in the table 510. If the row was updated by another transaction, the DBMS may determine if the commit time of the prior version was after the snapshot time of the transaction. If so, the DBMS may access the next most prior version of the row until it finds a row that was updated by the transaction or that has a commit time before the snapshot time of the transaction.

To address the problem of seeing data in a materialized view, in one embodiment, the DBMS may flag each row in the additional data 507 of the table 505 with a visible/not visible flag. In this embodiment, the table 505 may represent the materialized view. If the transaction seeks to access data in the table 505, the DBMS may only return rows that have the visible flag set. To hide rows in a materialized view that should not be seen until the transaction commits, the DBMS may clear the visible flag (e.g., mark the row as invisible).

In one embodiment, the value of the visible flag is derived from all the rows from the tables in the view definition that are processed in order to compute the incremental change to be applied to the view. Going back to the previous example described in conjunction with FIG. 4, the row inserted in the view V by User 2 will be computed by joining the newly inserted row in table R2 by User 2 with the matching rows in table R1. In this case, there will be one matching row that was inserted by another transaction after User 2's snapshot was taken, which means that the row inserted in the view will be marked as invisible. If User 1 committed the insert of the matching row in table R1 before User 2's snapshot had been taken, the row inserted in the view V would have been marked as visible.

In another embodiment, the DBMS may provide two transaction IDs to each transaction. When the transaction updates a materialized view with an update that should be seen by the transaction, the DBMS may mark the row with the first transaction ID given to the transaction. When the transaction updates a materialized view with an update that should not be seen by the transaction, the DBMS may mark the row with the second transaction ID. When the transaction requests information regarding the table 505, the DBMS may return data associated with the first transaction ID, but not with the second transaction ID.

It will be recognized that in other database system, other mechanisms may be employed to achieve this hiding effect without departing from the spirit or scope of the subject matter described herein.

Figure 6:
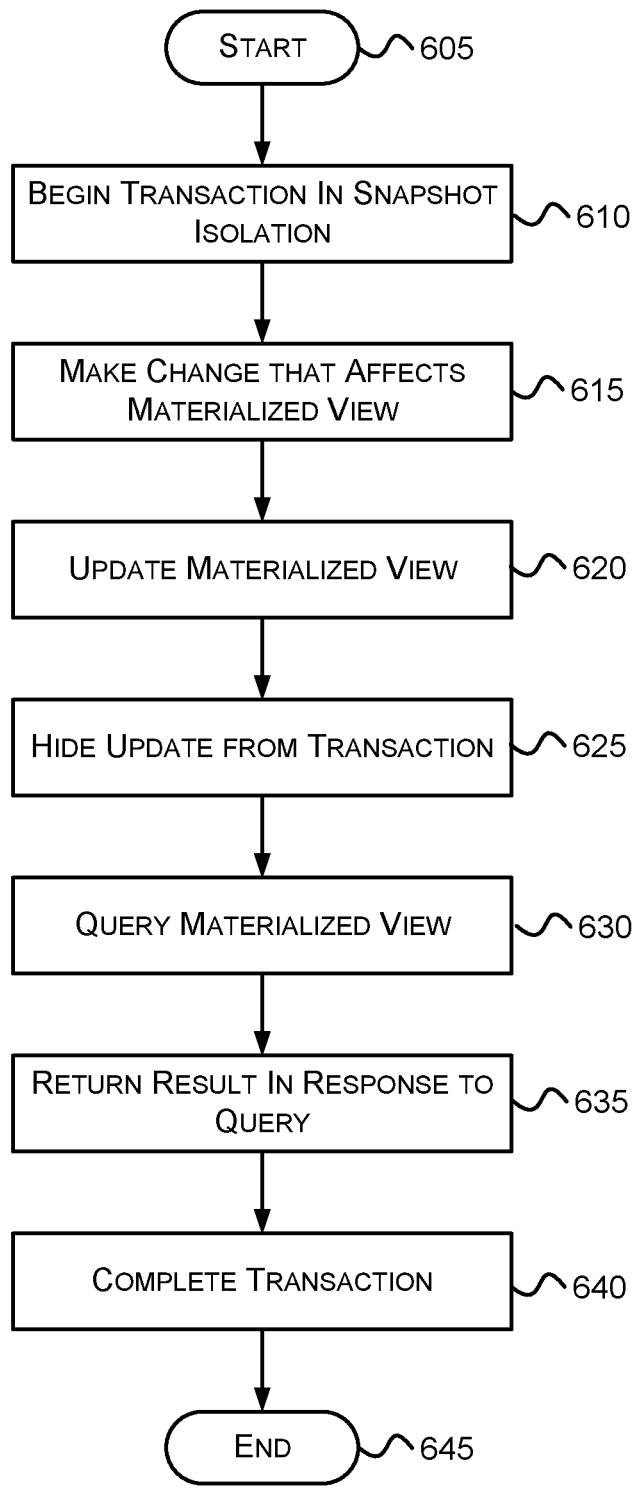
FIG. 6 is a flow diagram that generally represents exemplary actions that may occur in accordance with aspects of the subject matter described herein.

FIG. 6 is a flow diagram that generally represents exemplary actions that may occur in accordance with aspects of the subject matter described herein. At block 605, the actions begin.

At block 610, a transaction in snapshot isolation begins. For example, referring to FIG. 4, transaction X1 begins.

At block 615, the transaction or another transaction makes a change that affects a materialized view. For example, referring to FIG. 3B, transaction X1 inserts a row into table 315 and transaction X2 inserts a row into table 321. The rows are such that they affect the materialized view 322 (e.g., field A in table 320 equals field C in table 321).

At block 620, the transaction updates the materialized view. At block 625, the update to the materialized view is hidden from the transaction as described previously.

At block 630, the transaction queries the materialized view. Query in this sense means to perform any legal database operation with respect to the materialized view. Some exemplary database operations include selecting rows from or joining the materialized view with one or more other tables to form a result.

At block 635, results are returned in response to the query. As described previously, the results do not include data derived from updates that occurred to the materialized view after the transaction began if such updates were derived from changes made to other tables involved in the view definition by concurrent transactions that had been committed after the current transaction's snapshot was taken. If the changes had been committed before the beginning of the current transaction, then the results will include the data.

At block 640, the transaction completes (e.g., commits or aborts). Note that if the transaction aborts, the updates to the materialized view may be rolled back.

At block 645, the actions end.

One or more of the actions may be combined or the order may be changed as will be recognized by those skilled in the art without departing from the spirit or scope of aspects of the subject matter described herein. For example, updating the materialized view in block 620 may include hiding the update from the transaction in block 625 while doing the update.

Figure 7:
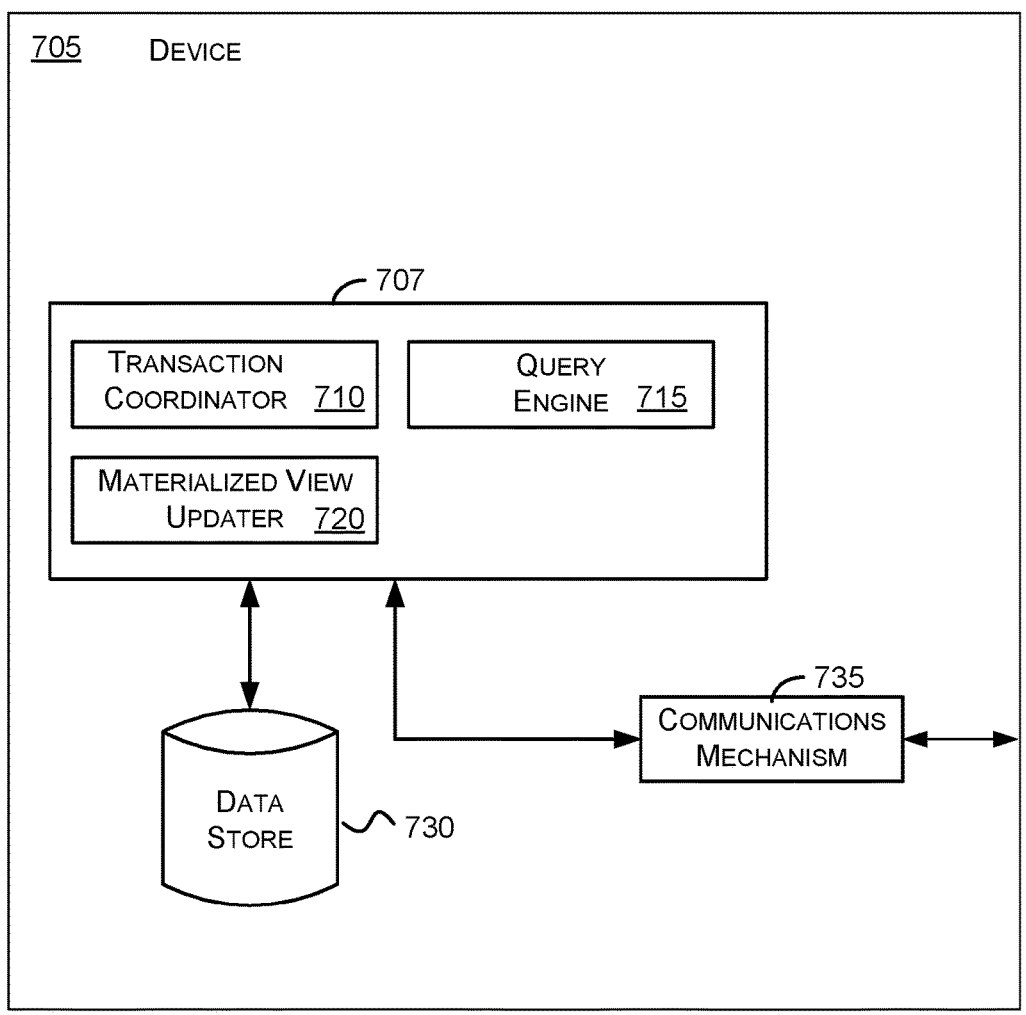
FIG. 7 is a block diagram that represents an exemplary device configured to operate in accordance with aspects of the subject matter described herein.

FIG. 7 is a block diagram that represents an exemplary device configured to operate in accordance with aspects of the subject matter described herein. The device 705 may include a database management system (DBMS) 707, a data store 730, and a communications mechanism 735. The DBMS 707 may include a transaction coordinator 710, a query engine 715, and a materialized view updater 720.

The transaction coordinator 710 may provide transaction support including snapshot isolation. The DBMS 707 may coordinate transaction starting, committing, and aborting through the transaction coordinator 710.

The materialized view updater 720 updates materialized views according to criteria specified for the views. The materialized view update 720 may incrementally update a materialized view when data in tables the materialized view depends on changes. The materialized view updater 720 may place additional information in a row of an update in a materialized view if needed to indicate that the row is not to be seen by a particular transaction as described previously.

The query engine 715 may operate to obtain data from tables and materialized views. When obtaining data from a materialized view, the query engine 715 may hide an update from a query issued within a transaction in which the update was created if hiding the data is indicated in additional data included in the update. This helps avoid data inconsistencies as indicated previously.

The communications mechanism 735 allows the device 705 to communicate with other devices to receive queries, updates, and the like and to provide data in response to queries, for example. The communications mechanism 640 may be a network interface or adapter 170, modem 172, or any other means for establishing communications as described in conjunction with FIG. 1.

It will be recognized that other variations of the device 705 shown in FIG. 7 may be implemented without departing from the spirit or scope of aspects of the subject matter described herein. It will be recognized that more, fewer, or other components may exist on the device 705 without departing from the spirit or scope of aspects of the subject matter described herein.

As can be seen from the foregoing detailed description, aspects have been described related to reducing update conflicts when maintaining views. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer storage medium having computer-executable instructions, which when executed perform actions, comprising:

within a transaction, making an update to a table in response to a first data modification that occurs after a beginning of the transaction and a second data modification committed by another transaction after the beginning of the transaction, the transaction having a view of data that existed as of the beginning of the transaction together with any changes the transaction has made to the data after the beginning of the transaction, the update occurring before the transaction completes; and before the transaction completes, without aborting the transaction, excluding the update from the transaction such that a query of the table within the transaction does not return the update made by the transaction, returning a result in response to the query based on data that existed as of the beginning of the transaction.

2. The computer storage medium of claim 1, wherein the table comprises a database object in which results from a previous query have been stored.

3. The computer storage medium of claim 2, wherein the database object is updated after data associated with the query changes.

4. The computer storage medium of claim 3, wherein the database object is updated (i) after the another transaction commits the second data modification to a data structure affecting the table but (ii) before the transaction completes.

5. The computer storage medium of claim 1, wherein excluding the update from the transaction comprises marking the update with a flag that indicates that the update is invisible to the transaction.

6. The computer storage medium of claim 1, wherein excluding the update from the transaction comprises associating the update with a transaction identifier other than a transaction identifier with which updates made within the transaction are obtained.

7. A method implemented at least in part by a computer, the method comprising:

within a transaction, updating a table as a result of (i) the transaction and (ii) another transaction committed after a beginning of the transaction, the transaction having a view of data that existed as of the beginning of the transaction as modified by a change the transaction has made after the beginning of the transaction;

within the transaction, querying the table; and in response to the querying, before the transaction completes, without aborting the transaction, excluding the update from the transaction thus returning a result that does not include information associated with the update to the table made by the transaction.

8. The method of claim 7, wherein the table comprises a result of a query of data, the result being stored for subsequent use.

9. The method of claim 8, wherein the table is updated incrementally as data that would affect the result of the query if performed again is updated, inserted, or deleted.

10. The method of claim 7, wherein returning a result that does not include information associated with the update comprises excluding data from a row of the table from the result, the row including additional data that indicates that the update is invisible to the transaction.

11. The method of claim 7, wherein returning a result that does not include information associated with the update comprises excluding data from a row of the table from the result, the row associated with additional data that indicates that the update is invisible to the transaction.

12. The method of claim 7, wherein returning a result that does not include information associated with the update comprises excluding data from a row of the table from the result, the row being updated, inserted, or deleted within the transaction, the row associated with additional data that associates the row with a transaction identifier that the transaction is not to be used to retrieve data from the table.

13. The method of claim 7, wherein querying the table comprises sending a query to a database management system, the query instructing the database management system to return data associated with the table that meets criteria specified in the query.

14. The method of claim 13, wherein the query instructs the database management system to join data with the table to obtain the result.

15. The method of claim 7, further determining whether the transaction is able to view the update by consulting additional information associated with the update, the additional information indicating that the update is unavailable to the transaction.

16. An apparatus, comprising:

a computing system environment comprising a processing unit coupled to a system memory, the computing system environment further comprising:

a transaction coordinator operable to provide isolation to transactions, the isolation providing a view to each transaction of data that existed at a time said transaction began;

a table updater operable to update a table to include an indication that a transaction in which the table was updated is not allowed to see the update, wherein the indication comprises an identifier associated with the transaction, the identifier indicating that the update was caused by both (i) the transaction and (ii) another transaction committed after a beginning of the transaction; and a query engine operable to obtain data from the table in accordance with the indication, the query engine further operable to, in order to prevent the transaction from obtaining inconsistent data, based upon the identifier indicating that the update was caused by the transaction, exclude the update from the transaction such that a query of the table within the transaction does not return the update made by the transaction.

17. The apparatus of claim 16, wherein the indication comprises a flag in additional data associated with a row of the table, the flag indicating whether the row of the table is visible to the transaction.

18. The apparatus of claim 16, wherein the identifier is different from an identifier the transaction uses to obtain data from the table.

19. The apparatus of claim 16, wherein the table comprises a result of a query of data, the result being stored for subsequent use.

20. The apparatus of claim 19, wherein the table is updated incrementally as data that would affect the result of the query if performed again is updated, inserted, or deleted.

* * * * *